Jan. 17, 1928.
C. C. HANSEN
1,656,708
AIR LINE OILER
Filed Jan. 11, 1927
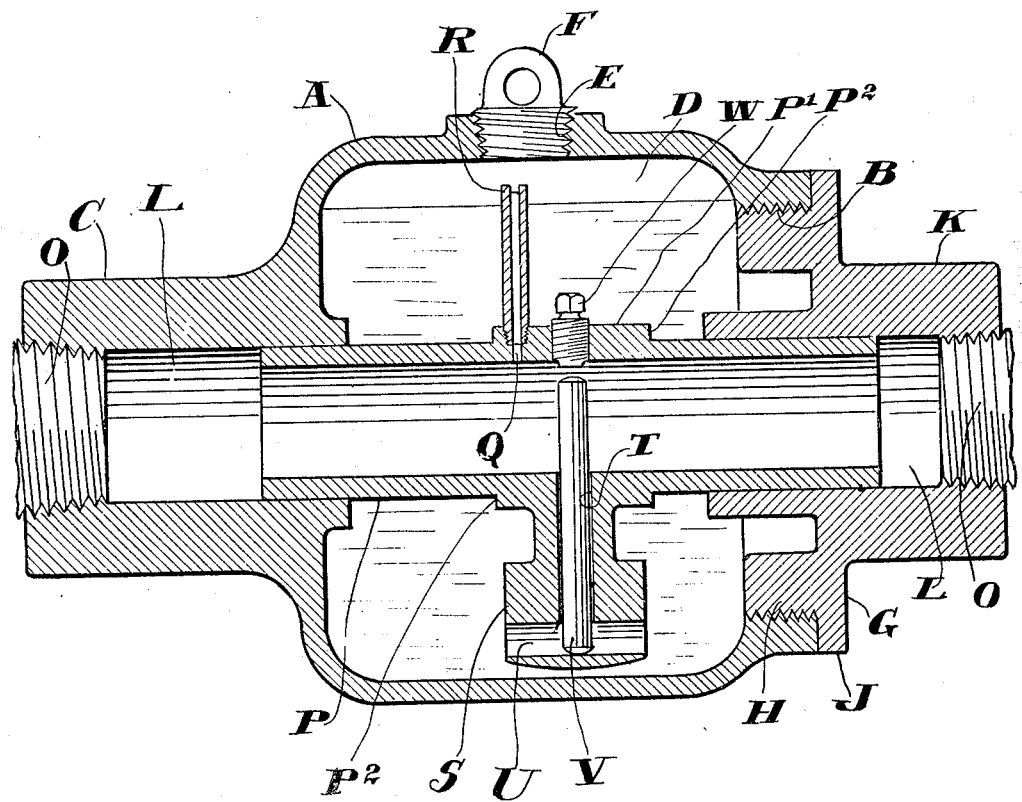
INVENTOR.
Charles C. Hansen.
BY Herbert K. Ogden
HIS ATTORNEY.

Patented Jan. 17, 1928.

1,656,708

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

AIR-LINE OILER.

Application filed January 11, 1927. Serial No. 160,482.

This invention relates to oiling devices, but more particularly to an air line oiler adapted to be attached to pressure fluid supply lines used for conveying pressure fluid to rock drills and other similar engines.

The objects of the invention are to prevent interruptions in drilling operations for the purpose of introducing lubricant to the rock drill, and to insure a constant and uniform delivery of oil into the pressure fluid flowing through the oiler in any of the various positions which the oiler may occupy in practice.

Other objects will appear hereinafter and to all of these ends the invention consists of the combination of elements and features of construction substantially as hereinafter described and claimed and illustrated in the accompanying drawing, which is a longitudinal sectional elevation of an oiler constructed in accordance with the practice of the invention.

Referring to the drawing, A designates a casing having a threaded aperture B in one end and at its other end a projection C. The interior of the casing A forms an oil reservoir D for oil or other suitable lubricant which may be introduced into the casing through a threaded opening E normally sealed by a filler plug F.

A suitable closure is provided for one end of the casing A by a plug G which has a threaded portion H to cooperate with the threaded opening B and also has a lateral flange J which seats against the end of the casing A to prevent leakage of oil from the casing. The plug G also has a projection K and in these projections K and C are formed passage-ways L which serve as continuations of an air line O screwed into the outer ends of the passage-ways L and adapted to convey pressure fluid from a source of supply to the machine intended to be actuated thereby. In accordance with the invention a tube P is disposed in the passage-ways L to bridge said passage-ways, thus forming a central path for the pressure fluid through the reservoir D. The outer diameter of the tube P is preferably of a size which will permit the said tube to slide and rotate freely within the passage-ways L and at the same time prevent the passage of oil from the reservoir between the cooperating surfaces of the tube P and the passage-ways L.

In order to insure an adequate supply of pressure fluid in the reservoir D to create a pressure on the surface of the lubricant contained therein, a transverse passage Q is formed in the wall of the tube P to register with a pipe R screwed in the tube P. The pipe R is preferably of a length to enable its outer or free end to extend near the wall of the casing A so that the reservoir D may be practically filled with lubricant without any of the lubricant finding its way through the pipe R into the tube P.

On the tube P and preferably diametrically opposite to the pipe R is formed a weight S of suitable proportions and weight to rock the tube P so that the pipe R will always be caused to remain in a substantially upright position irrespective of the position of the casing, thus preventing the admission of oil through the pipe and also insuring a constant supply of oil to the interior of the tube P through the channels provided for this purpose. These channels in the present instance consist of a transverse passage T formed in the weight S and a longitudinal passage U extending through the weight S preferably near its outer edge to communicate at both ends with the reservoir D and also with the passage T at a point intermediate the ends of said passage U.

Intermediate the ends of the tube P is formed an external collar or flange P' at the ends of which are formed shoulders P² to cooperate with the inner ends of the projections C and K for limiting endwise movement of the tube P.

Disposed in the passage T is a pin V for delivering oil from the reservoir D into the tube P. The pin V is preferably seated with its outermost end on the wall of the passage U and extends with its other end through the tube P to a point near the wall of the tube opposite the passage T. The pin V is of sufficiently smaller diameter than the passage T to enable a certain portion of oil to be advanced through the passage T in the direction of the tube P by the reciprocatory action of the pin V.

Suitable means are provided for limiting endwise movement of the pin V in the passage T. In the present instance this means consists of a set screw W screwed into the wall of the tube P and so positioned with respect to the pin V that its end may form an abutment for the inner end of the pin.

The operation of the device is as follows: Pressure fluid, such as compressed air, entering the tube P from the air line O will, due to the pulsations in the air line, cause a reciprocatory action of the pin V in the passage T. Since the outer end of the pin V is at all times immersed in oil, some of the oil will be advanced through the passage T into the tube P to intermingle with the pressure fluid flowing through the tube and be carried thereby to the drill or other engine to which the pressure fluid is being supplied.

Owing to the fact that the tube P may both rotate freely with respect to the casing and also slide freely longitudinally of the casing, the outer end of the pipe R will at all times remain above the oil level, thus insuring against an uncontrolled flow of oil into the air line, and the inlet passage U will also be in constant communication with the supply of oil in the reservoir.

Inasmuch that the tube P is slidable in the passage-ways L said tube may, under the action of the weight S, slide to one or the other of the extreme positions which it may assume in the casing, thus enabling practically the entire supply of lubricant to be exhausted from the reservoir. In other words, the present invention enables the reservoir to be practically emptied after each filling and therefore does not require that the reservoir be of unusually large dimensions in order to prevent frequent interruptions in the drilling for the purpose of replenishing the supply of oil in the reservoir.

The length of the reciprocations of the pin V may be varied by means of the screw W to suit various grades of oil. For instance, if it be desired to use a heavy grade of oil, the screw W may be adjusted to allow maximum reciprocation of the pin V. On the other hand, if conditions require a light grade of oil, the screw W may be screwed in the direction of the pin V thus shortening the strokes of the pin and consequently reducing the amount of oil introduced into the tube P at each movement of the pin.

I claim:

1. An air line oiler comprising a casing forming an oil reservoir, said casing having passage-ways for pressure fluid in opposite ends, a tube slidable in the passage-ways bridging the passage-ways, a weight on the side of the tube for sliding the tube longitudinally of the passage-ways towards the lowermost portion of the reservoir, said weight having a passage for conveying oil from the reservoir into the tube, and a pin in the passage adapted to be reciprocated by the pulsations occurring in the pressure fluid flowing through the tube for delivering oil from the reservoir into the tube.

2. An air line oiler comprising a casing forming an oil reservoir, said casing having passage-ways for pressure fluid in opposite ends, a tube rotatable and longitudinally slidable in the passage-ways bridging said passage-ways, a pipe carried by the tube to convey pressure fluid from the tube into the reservoir, a weight on the side of the tube slidably and rotatably actuating the tube toward the lowermost portion of the reservoir, said weight having a longitudinal passage near its outer edge and a transverse passage leading from the longitudinal passage for conveying oil from the reservoir into the tube, a pin in the transverse passage actuated by the pulsations occurring in the pressure fluid flowing through the tube for delivering oil into the tube, said pin being seated with one end in the longitudinal passage and extending with its other end into the tube, a screw in the tube for limiting reciprocation of the pin, and shoulders on the tube cooperating with the casing for limiting slidable movement of the tube in the passage-ways.

In testimony whereof I have signed this specification.

CHARLES C. HANSEN